United States Patent
Irsoy et al.

(10) Patent No.: US 11,783,812 B2
(45) Date of Patent: Oct. 10, 2023

(54) DIALOGUE ACT CLASSIFICATION IN GROUP CHATS WITH DAG-LSTMS

(71) Applicant: Bloomberg Finance L.P., New York, NY (US)

(72) Inventors: Ozan Irsoy, New York, NY (US); Rakesh Gosangi, Long Island City, NY (US); Haimin Zhang, Short Hills, NJ (US); Mu-Hsin Wei, Redmond, WA (US); Peter John Lund, New York, NY (US); Duccio Pappadopulo, New York, NY (US); Brendan Michael Fahy, New York, NY (US); Neophytos Nephytou, Glen Cove, NY (US); Camilo Ortiz Diaz, New York, NY (US)

(73) Assignee: Bloomberg Finance L.P.

( * ) Notice: Subject to any disclaimer, the term of this patent is extended or adjusted under 35 U.S.C. 154(b) by 191 days.

(21) Appl. No.: 17/234,745

(22) Filed: Apr. 19, 2021

(65) Prior Publication Data

US 2021/0335346 A1    Oct. 28, 2021

Related U.S. Application Data

(60) Provisional application No. 63/016,601, filed on Apr. 28, 2020.

(51) Int. Cl.
*G10L 15/28* (2013.01)
*G10L 15/16* (2006.01)

(52) U.S. Cl.
CPC .............. *G10L 15/16* (2013.01); *G10L 15/28* (2013.01)

(58) Field of Classification Search
CPC ......... G10L 15/16; G10L 15/22; G10L 15/26; G10L 2015/223; G10L 21/10; G10L 25/63; G10L 13/00; G10L 15/063; G10L 15/1822; G10L 15/197; G10L 15/1815;
(Continued)

(56) References Cited

U.S. PATENT DOCUMENTS 10,764,431 B1 * 9/2020 Pham ...................... G10L 15/26
10,885,277 B2 * 1/2021 Ravi ..................... G06F 40/253
2019/0286698 A1 * 9/2019 Gupta ..................... G06F 17/18
(Continued)

FOREIGN PATENT DOCUMENTS

WO    WO-2020020041 A1 *   1/2020    ......... G06F 16/3329

OTHER PUBLICATIONS

Irsoy et al., "Dialogue Act Classification in Group Chats with DAG-LSTMs," 2019, SIGIR 2019 Workshop on Conversational Interaction Systems, 7 pgs.
(Continued)

*Primary Examiner* — Abdelali Serrou
(74) *Attorney, Agent, or Firm* — CHIESA, SHAHINIAN & GIANTOMASI PC

(57) ABSTRACT

Systems and methods for classifying a dialogue act in a chat log are provided. Each word of the dialogue act is mapped to a word vector representation. An utterance vector representation of the dialogue act is computed based on the word vector representations. An additional utterance vector representation of the dialogue act is computed based on the utterance vector representation. The additional utterance vector representation is mapped to a classification of the dialogue act.

12 Claims, 9 Drawing Sheets

(58) Field of Classification Search
CPC ... G10L 2015/226; G10L 15/28; G06F 40/35; G06F 40/284; G06F 40/117

See application file for complete search history.

(56) References Cited

U.S. PATENT DOCUMENTS

| | | | | |
|---|---|---|---|---|
| 2020/0150780 | A1* | 5/2020 | Wu | G06F 16/3329 |
| 2020/0152184 | A1* | 5/2020 | Steedman Henderson | G10L 15/197 |
| 2020/0168210 | A1* | 5/2020 | Seo | G06F 18/22 |
| 2020/0193265 | A1* | 6/2020 | Hill | G06F 18/22 |
| 2021/0217408 | A1* | 7/2021 | Hakkani-Tur | G06F 40/284 |
| 2021/0263952 | A1* | 8/2021 | Gupta | G06F 40/284 |
| 2022/0215177 | A1* | 7/2022 | Chen | G06F 40/35 |
| 2023/0029759 | A1* | 2/2023 | Choi | G10L 15/16 |
| 2023/0046658 | A1* | 2/2023 | Bowers | G10L 13/04 |

OTHER PUBLICATIONS

Ang et al., "Automatic dialog act segmentation and classification in multiparty meetings," 2005, Proceedings. (ICASSP 05). IEEE International Conference on Acoustics, Speech, and Signal Processing, vol. 1, pp. I/1061-I/1064.

Asher et al., "Discourse Structure and Dialogue Acts in Multiparty Dialogue: the STAC Corpus," 2016, 10th International Conference on Language Resources and Evaluation, pp. 2721-2727.

J.L. Austin, "How to do things with words," 1975, Oxford University Press, 174 pgs.

Rojas-Barahona et al., "Exploiting Sentence and Context Representations in Deep Neural Models for Spoken Language Understanding," 2016, Proceedings of COLING 2016, the 26th International Conference on Computational Linguistics: Technical Papers, 10 pgs.

Bunt et al., "ISO 24617-2: A semantically-based standard for dialogue annotation," 2012, Proceedings of the Eight International Conference on Language Resources and Evaluation, 8 pgs.

Cadilhac et al., "Grounding strategic conversation: Using negotiation dialogues to predict trades in a win-lose game," 2013, Proceedings of the 2013 Conference on Empirical Methods in Natural Language Processing, pp. 357-368.

Chen et al., "Enhancing and Combining Sequential and Tree LSTM for Natural Language Inference," 2016, arXiv preprint arXiv:1609.06038, 10 pgs.

Chen et al., "Tree-to-tree Neural Networks for Program Translation," 2018, Advances in Neural Information Processing Systems, pp. 2547-2557.

Chen et al., "DAG-based Long Short-Term Memory for Neural Word Segmentation," 2017, arXiv preprint arXiv:1707.00248, 10 pgs.

Dielmann et al., "Recognition of Dialogue Acts in Multiparty Meetings Using a Switching DBN," 2008, IEEE transactions on audio, speech, and language processing vol. 16, No. 7, pp. 1303-1314.

Fernandez et al., "Dialog Act Classification from Prosodic Features Using Support Vector Machines," 2002, Speech Prosody 2002, 4 pgs.

Forsyth et al., "Lexical and Discourse Analysis of Online Chat Dialog," 2007, International Conference on Semantic Computing (ICSC 2007), pp. 19-26.

Graves et al., "Framewise phoneme classification with bidirectional LSTM and other neural network architectures," 2005, Neural Networks vol. 18, issues 5-6, pp. 602-610.

Hochreiter et al., "Long Short-Term Memory," 1997, Neural Computation, vol. 9, No. 8, pp. 1735-1780.

Jurafsky et al., "Automatic detection of discourse structure for speech recognition and understanding," 1997, IEEE Workshop on Automatic Speech Recognition and Understanding Proceedings, pp. 88-95.

Kalchbrenner et al., "Recurrent Convolutional Neural Networks for Discourse Compositionality," 2013, Proceedings of the Workshop on Continuous Vector Space Models and their Compositionality, pp. 119-126.

Kim et al., "Classifying Dialogue Acts in One-on-one Live Chats," 2010, Proceedings of the 2010 Conference on Empirical Methods in Natural Language Processing, pp. 862-871.

Kim et al., "Classifying Dialogue Acts in Multi-party Live Chats," 2012, Proceedings of the 26th Pacific Asia Conference on Language, Information, and Computation, pp. 463-472.

Kingma et al., "Adam: A Method for Stochastic Optimization," 2015, arXiv preprint arXiv: 1412.6980 (2014), 3rd International Conference for Learning Representations, 15 pgs.

Li et al., "DailyDialog: A Manually Labelled Multi-turn Dialogue Dataset," 2017, Proceedings of the Eighth International Joint Conference on Natural Language Processing (vol. 1), pp. 986-995.

Liu et al., "Using Context Information for Dialog Act Classification in DNN Framework," 2017, Proceedings of the 2017 Conference on Empirical Methods in Natural Language Processing, pp. 2170-2178.

Maillard et al., "Jointly learning sentence embeddings and syntax with unsupervised Tree-LSTM," 2017, 31st Conference on Neural Information Processing Systems (NIPS 2017), arXiv preprint arXiv:1705.09189, 11 pgs.

Manning et al., "The Stanford CoreNLP Natural Language Processing Toolkit," 2014, Proceedings of 52nd annual meeting of the association for computational linguistics: system demonstrations, pp. 55-60.

McTear et al., "The Conversational Interface: Talking to Smart Devices," 2016, Springer, 431 pgs.

Pennington et al., "GloVe: Global Vectors for Word Representation," 2014, Proceedings of the 2014 Conference on Empirical Methods in Natural Language Processing (EMNLP), pp. 1532-1543.

Ribeiro et al., "The Influence of Context on Dialogue Act Recognition," 2015, arXiv preprint arXiv:1506.00839, 33 pgs.

Ribeiro et al., "Deep Dialog Act Recognition using Multiple Token, Segment, and Context Information Representations," 2018, arXiv preprint arXiv:1807.08587, 38 pgs.

Searle et al., "Speech Acts: An Essay in the Philosophy of Language," 1969, vol. 626. Cambridge university press, 209 pgs.

Serban et al., "A Survey of Available Corpora for Building Data-Driven Dialogue Systems," 2018, Dialogue & Discourse vol. 9, No. 1, pp. 1-49.

Shriberg et al., "The ICSI Meeting Recorder Dialog Act (MRDA) Corpus," 2004, Proceedings of the 5th SIGdial Workshop on Discourse and Dialogue at HLT-NAACL, 4 pgs.

Sridhar et al., "Combining lexical, syntactic and prosodic cues for improved online dialog act tagging," 2009, Computer Speech & Language, vol. 23, Issue 4, pp. 407-422.

Stolcke et al., "Dialogue Act Modeling for Automatic Tagging and Recognition of Conversational Speech," 2000, Computational Linguistics, vol. 26, No. 3, pp. 339-373.

Surendran et al., "Dialog Act Tagging with Support Vector Machines and Hidden Markov Models," 2006, Ninth International Conference on Spoken Language Processing, pp. 1950-1953.

Tai et al., "Improved Semantic Representations From Tree-Structured Long Short-Term Memory Networks," 2015, Proceedings of the 53rd Annual Meeting of the Association for Computational Linguistics and the 7th International Joint Conference on Natural Language Processing vol. 1, 11 pgs.

Wen et al., "Semantically Conditioned LSTM-based Natural Language Generation for Spoken Dialogue Systems," 2015, Proceedings of the 2015 Conference on Empirical Methods in Natural Language Processing, pp. 1711-1721.

Wu et al., "Posting Act Tagging Using Transformation-Based Learning," 2005, Foundations of data mining and knowledge discovery. Springer, pp. 319-331.

Young et al., "POMDP-Based Statistical Spoken Dialog Systems: A Review," 2013, Proceedings of the IEEE, vol. 101, No. 5, pp. 1160-1179.

(56) References Cited

OTHER PUBLICATIONS

Zhao et al., "Towards End-to-End Learning for Dialog State Tracking and Management using Deep Reinforcement Learning," 2016, 17th Annual Meeting of the Special Interest Group on Discourse and Dialogue, pp. 1-10.
Zhu et al., "DAG-Structured Long Short-Term Memory for Semantic Compositionality," 2016, Proceedings of the 2016 Conference of the North American Chapter of the Association for Computational Linguistics: Human Language Technologies, pp. 917-926.
Zhu et al., "Long Short-Term Memory Over Recursive Structures," 2015, Proceedings of the 32nd International Conference on Machine Learning, pp. 1604-1612.

* cited by examiner

500

| Dialog Act | Count |
|---|---|
| Accept | 658 |
| Counteroffer | 643 |
| Offer | 1571 |
| Other | 7012 |
| Refusal | 1546 |
| *Preference (discarded)* | 8 |

FIG. 5

| Model | Accept | Counteroffer | Offer | Other | Refusal | Accuracy | Macro-F1 |
|---|---|---|---|---|---|---|---|
| CNN + LSTM | 65.64 | 51.06 | 77.54 | 93.57 | 84.33 | 86.43 | 74.43 |
| CNN + CNN | 65.42 | 47.89 | 75.81 | 92.00 | 83.66 | 85.32 | 73.10 |
| BiLSTM + no utterance context | 46.83 | 41.24 | 71.64 | 89.01 | 76.28 | 79.49 | 65.00 |
| BiLSTM + LSTM | 63.93 | 50.17 | 79.03 | 94.12 | 85.59 | 86.83 | 74.57 |
| BiLSTM + DAG-LSTM | 64.29 | 51.69 | 81.97 | 94.42 | 86.54 | 87.69 | 75.78 |

| Participant | Conversation (tokenized) | Gold | DAG-LSTM | LSTM |
|---|---|---|---|---|
| | ... | | | |
| william | can i get a clay from someone ? | Offer | Offer | Offer |
| ljaybrad123 | none sorry | Refusal | Refusal | Refusal |
| tomas.kostan | anyone have some wood to spare ? | Offer | Offer | Offer |
| william | for clay ... | Counteroffer | Counteroffer | Counteroffer |
| ljaybrad123 | no sorry | Refusal | Refusal | Refusal |
| tomas.kostan | for a sheep | Offer | Offer | Counteroffer |
| william | for ore ? | Counteroffer | Counteroffer | Counteroffer |
| tomas.kostan | can only offer a sheep | Offer | Offer | Counteroffer |
| william | got enough . sorry | Refusal | Refusal | Refusal |
| william | i can give you a lot of clay, anyone ? | Offer | Offer | Counteroffer |
| tomas.kostan | no sry | Refusal | Refusal | Refusal |
| | ... | | | |
| tomas.kostan | no clay ? | Offer | Offer | Offer |
| ljaybrad123 | i have clay | Accept | Counteroffer | Offer |
| gotwood4sheep | LJ has one | Other | Other | Other |
| ljaybrad123 | I want wood | Counteroffer | Counteroffer | Offer |
| gotwood4sheep | my one grrrrrr | Other | Other | Refusal |
| ljaybrad123 | :D | Other | Other | Other |
| | ... | | | |
| Kersti | anyone need sheep?l | Offer | Offer | Offer |
| Kersti | I have a large quantity of them | Offer | Offer | Other |
| Kersti | and could do with wheat / wood instead | Offer | Offer | Counteroffer |
| Tyrant Lord | no | Refusal | Refusal | Refusal |
| Tyrant Lord | sorry | Other | Other | Other |
| Kersti | it 's good quality wool this season ! | Other | Other | Other |
| sparkles | i do want sheep , | Other | Other | Other |
| sparkles | but I need all my resources . | Other | Other | Refusal |
| sparkles | I might want to trade after I roll ... | Refusal | Other | Other |
| sparkles | sorry for being rubbish ! | Other | Other | Other |
| | ... | | | |

…

DIALOGUE ACT CLASSIFICATION IN GROUP CHATS WITH DAG-LSTMS

CROSS-REFERENCE TO RELATED APPLICATIONS

This application claims the benefit of U.S. Provisional Application No. 63/016,601, filed Apr. 28, 2020, the disclosure of which is herein incorporated by reference in its entirety.

TECHNICAL FIELD

The present invention relates generally to classification of dialogue acts, and in particular to classification of dialogue acts in group chats with DAG-LSTMs (directed-acyclic-graph long short-term memory).

BACKGROUND

A dialogue act is an utterance in conversational dialogue that serves a function in the dialogue. Examples of a dialogue act include a question, an answer, a request, or a suggestion. Classification of dialogue acts is an important task for workflow automation and conversational analytics. Conventionally, machine learning techniques have been applied for classification of dialogue acts. Such conventional machine learning techniques typically predict classifications of dialogue acts based on textual content of the dialogue acts, the user who generated the dialogue acts, and contextual information of the dialogue acts.

With the increasing prevalence of chat and messaging applications, classification of dialogue acts in group chats is of particular importance. However, classification of dialogue acts in group chats has a number of challenges. Group chats may include multiple participants simultaneously conversing, leading to entanglements of utterances. Further, unlike spoken conversations, written conversations do not have any prosodic cues. In addition, due to the informal nature of group chats, they tend to include domain-specific jargon, abbreviations, and emoticons. Accordingly, group chats do not include sufficient information for classification of dialogue acts using conventional techniques.

BRIEF SUMMARY OF THE INVENTION

In accordance with one or more embodiments, systems and methods for classifying a dialogue act in a chat log are provided. Each word of the dialogue act is mapped to a word vector representation. An utterance vector representation of the dialogue act is computed based on the word vector representations. An additional utterance vector representation of the dialogue act is computed based on the utterance vector representation. The additional utterance vector representation is mapped to a classification of the dialogue act.

In one embodiment, the additional utterance vector representation is computed based on utterance vector representations of all prior dialogue acts in the chat log and an utterance vector representation of an immediately prior dialogue act of the same participant as the dialogue act.

In one embodiment, the utterance vector representation is computed using a bidirectional long short-term memory (LSTM) architecture and the additional utterance vector representation is computed using a modified tree long short-term memory (LSTM) based architecture.

In one embodiment, the chat log is a transcript of a conversation between a plurality of participants.

These and other advantages of the invention will be apparent to those of ordinary skill in the art by reference to the following detailed description and the accompanying drawings.

BRIEF DESCRIPTION OF THE DRAWINGS

FIG. 5 shows a table of frequency counts of dialogue acts in a dataset used for experimentally validating embodiments described herein;

FIG. 6 shows a table comparing results of embodiments described herein against conventional models;

FIG. 8 shows a table comparing classifications of dialogue acts predicted in accordance with embodiments described herein against a conventional model.

DETAILED DESCRIPTION

Embodiments described herein provide for the classification of dialogue acts in a chat log using directed-acyclic-graph long short-term memory networks (DAG-LSTMs). Such DAG-LSTMs are implemented with skip connections to incorporate contextual information from all prior dialogue acts in the chat log and prior dialogue acts from the same participant. Advantageously, by incorporating such contextual information, embodiments described herein provide of the classification of dialogue acts with higher accuracy as compared to conventional approaches.

Formally, a chat log U comprises a set of dialogue acts (or utterances) $\{u_k\}_{k=1}^{K}$, of a chat sessions, where each dialogue act $u_k$ comprises a set of words $\{w_t^k\}_{t=1}^{T}$. Each dialogue act $u_k$ is generated by one of the participants $p_k \in P$, where P denotes the set of participants in the chat session. Given the set of dialogue acts $\{u_k\}_{k=1}^{K}$, embodiments described herein assign each dialogue act $u_k$ with a classification $y_k \in Y$, where Y denotes the set of predefined classifications.

The classification of dialogue acts $u_k$ is formulated as a sequence modeling task solved using a variant of Tree-LSTMs. First, each word $w_t^k$ of a dialogue act $u_k$ is mapped to a dense fixed-size word vector representation $\omega_t^k$. Then, an utterance vector representation $v_k$ of the dialogue act $u_k$ is computed using an utterance model based on the set of word vector representations $\{\omega_t^k\}_{t=1}^{T}$. Next, an additional utterance vector representation $\phi_k$ of the dialogue act $u_k$ is computed using a conversation model based on the utterance vector representation $v_k$ of the dialogue act $u_k$, all previously computed utterance vector representations $\{v_j\}_{j=1}^{k}$, and the prior utterance vector representation from the same participant, thereby contextualizing dialogue act $u_k$ and summarizes the state of the conversation at that point in time. The additional utterance vector representation $\phi_k$ is mapped to a classification $y_k$ using a classifier to classify the dialogue act.

In summary, classification of dialogue acts $u_k$ is performed based on the following operations:

$$\omega_t = \text{WordLookup}(w_t^k)$$

$$v_k = \text{UtteranceModel}(\{\omega_t^k\}_{t=1}^T)$$

$$\phi_k = \text{ConversationModel}(\{v_k\}_{j=1}^T)$$

$$y_k = \text{Classifier}(\phi_k)$$

Figure 1:
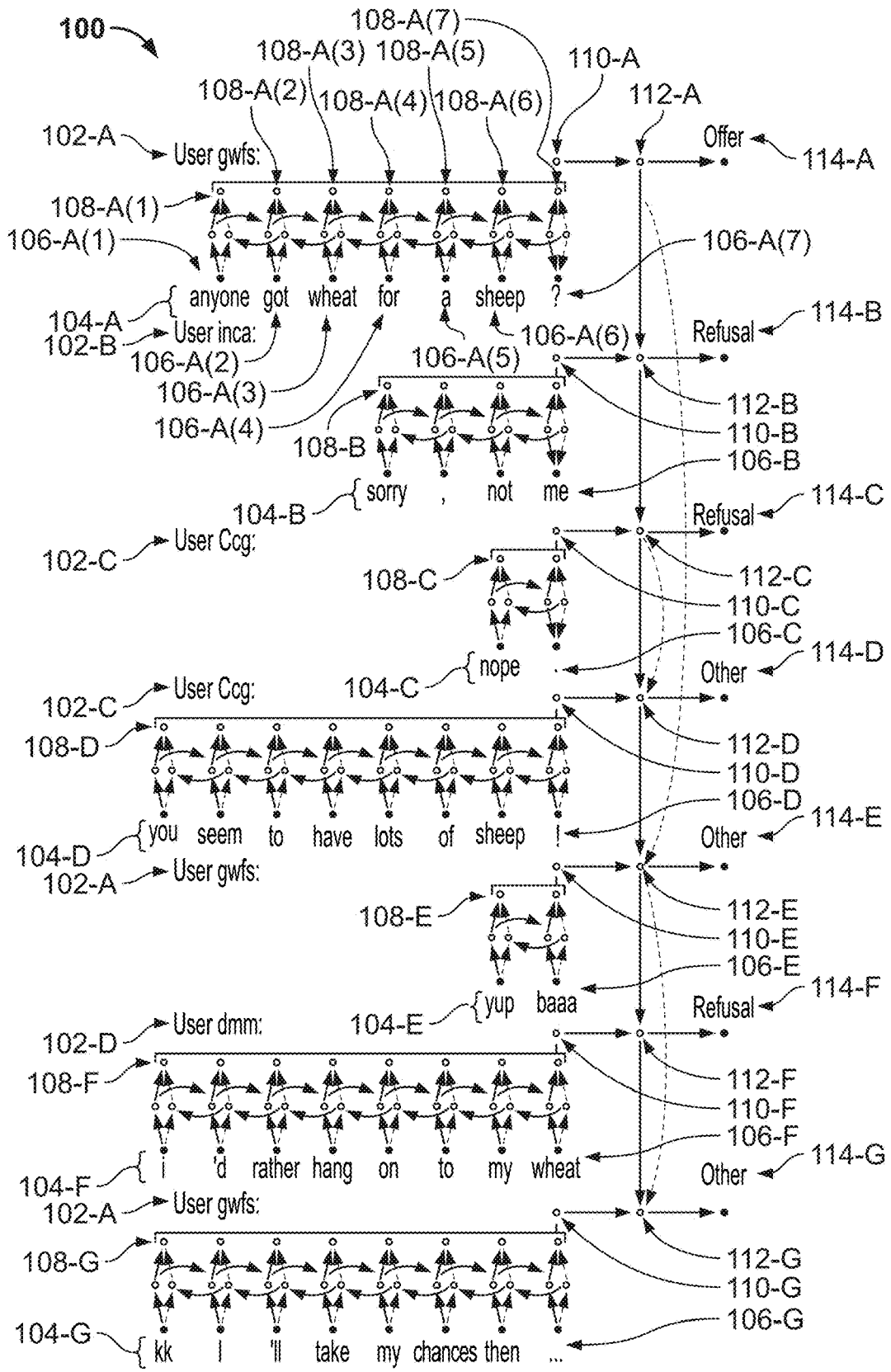
FIG. 1 shows a framework for classifying dialogue acts in a chat log, in accordance with one or more embodiments.
Figure 2:
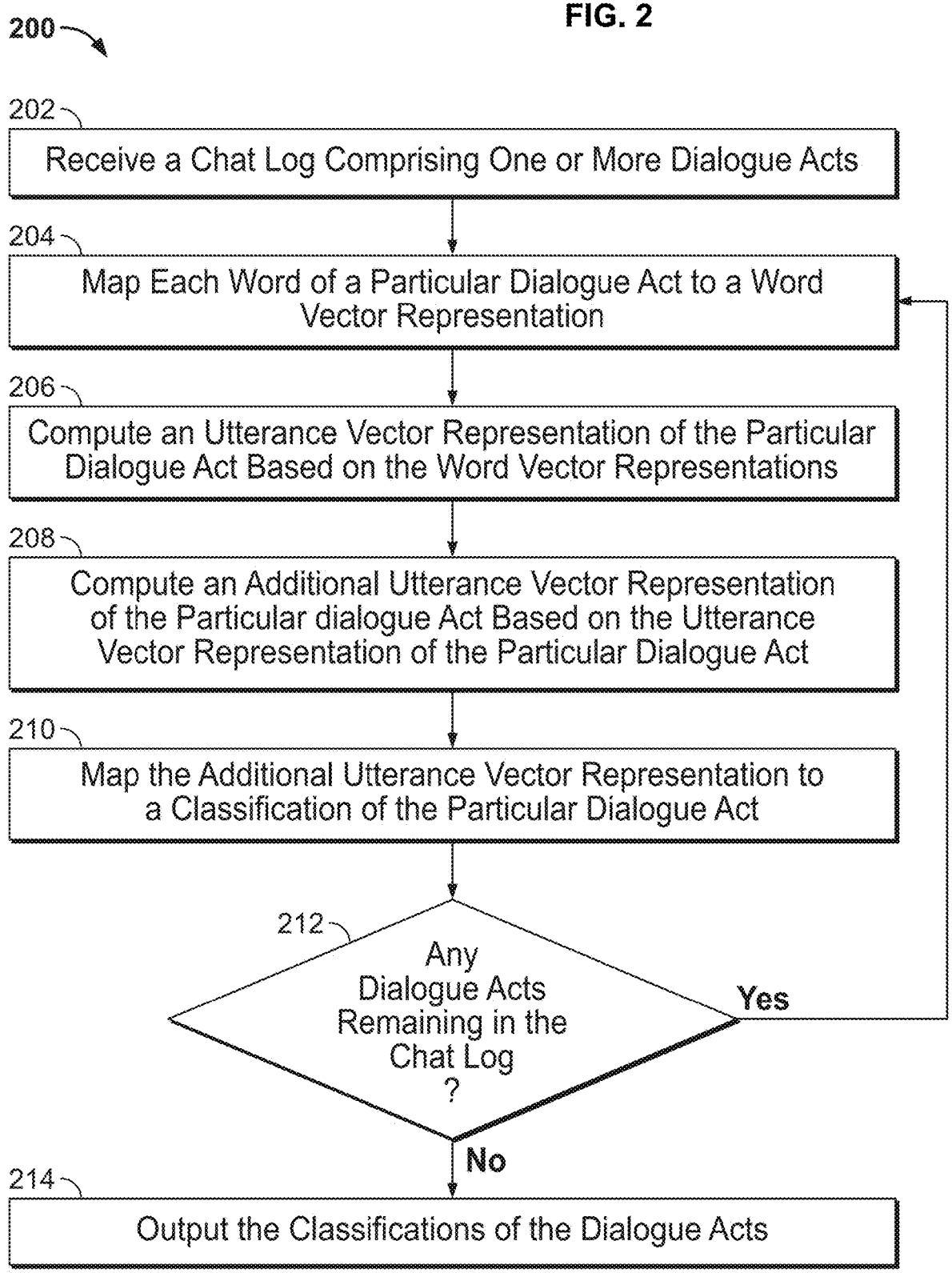
FIG. 2 shows a method for classifying dialogue acts in a chat log, in accordance with one or more embodiments.

FIG. 1 shows a framework 100 for classifying dialogue acts, in accordance with one or more embodiments. Framework 100 illustrates embodiments described herein implemented on a large scale messaging application. In particular, framework 100 shows architecture of a scalable system that provides dialogue act classification labels. FIG. 2 shows a method 200 for classifying dialogue acts, in accordance with one or more embodiments. FIGS. 1 and 2 will be described together. The steps of method 200 may be performed by one or more suitable computing devices, such as, e.g., computer 702 of FIG. 7.

At step 202, a chat log U comprising one or more dialogue acts $\{u_k\}_{k=1}^K$, is received. As shown in framework 100 of FIG. 1, the dialogue acts may be dialogue acts 104-A, 104-B, 104-C, 104-D, 104-E, 104-F, and 104-G (collectively referred to as dialogue acts 104) generated by participants or users 102-A, 102-B, 102-C, and 102-D (collectively referred to as users 102, where the same reference number refers to the same user). As used herein, a chat log refers to a transcript of a conversation between a plurality of participants. The conversation may be in any format, such as, e.g., a messaging thread (e.g., instant messaging, direct messaging, social networking posts, text messaging, email, messaging boards posts, chat rooms, etc.), a spoken conversation (e.g., a telephone call, a video conference, etc.), or any other suitable format whereby a plurality of participants communicate with each other. The chat log may be received by loading the chat log from a storage or memory of a computer system or by receiving the chat log from a remote computer system.

Steps 204-210 of FIG. 2 will be repeated for each particular dialogue act $u_k$ of the one or more dialogue acts $\{u_k\}_{k=1}^K$, in the chat log, starting from the first dialogue act $u_1$ to the last dialogue act $u_K$. Accordingly, during the first iteration, steps 204-210 are performed using the first dialogue act $u_1$ as the particular dialogue act.

At step 204, each word $w_t^k$ of the particular dialogue act $u_k$ is mapped to a word vector representation $\omega_t^k$. For example, in framework 100 of FIG. 1, each word 106-A(1), 106-A(2), 106-A(3), 106-A(4), 106-A(5), 106-A(6), and 106-A(7) (collectively referred to as words 106-A) of dialogue act 104-A is mapped to a word vector representation 108-A(1), 108-A(2), 108-A(3), 108-A(4), 108-A(5), 108-A (6), and 108-A(7) (collectively referred to as word vector representations 108-A). Although not specifically identified in framework 100 for simplicity, words 106-B, 106-C, 106-D, 106-E, 106-F, and 106-G (collectively, together with words 106-A, referred to as words 106) are similarly mapped to word vectors representations 108-B, 108-C, 108-D, 108-E, 108-F, and 108-G (collectively, together with word vector representation 108-A, referred to as word vector representations 108). As shown in FIG. 1, words $w_t^k$ include punctuation, such as, e.g., periods, question marks, exclamation points, commas, ellipses, etc.

A bidirectional LSTM is used to represent the particular dialogue act. Accordingly, let $\text{lstm}(\{x_j\}_{j=1}^t)$ be recursively defined as follows:

$$\text{lstm}(\{x_j\}_{j=1}^t) = \text{step}^{lstm}(x_t, \text{lstm}(\{x_j\}_{j=1}^{t-1}))$$ (Equation 1)

$$(h_t, c_t) = \text{step}^{lstm}(x_t, (h_{t-1}, c_{t-1}))$$ (Equation 2)

where the step function is defined such that:

$$h_i = \text{sigmoid}(W_{ix}x_t + W_{ih}h_{t-1} + W_{ic}c_{t-1} + b_i)$$ (Equation 3)

$$f_t = \text{sigmoid}(W_{fx}x_t + W_{fh}h_{t-1} + W_{fc}c_{t-1} + b_f)$$ (Equation 4)

$$o_t = \text{sigmoid}(W_{ox}x_t + W_{oh}h_{t-1} + W_{oc}c_t + b_o)$$ (Equation 5)

$$g_t = \tan h(W_{cx}x_t + W_{ch}h_{t-1} + b_c)$$ (Equation 6)

$$c_t = f_t \odot c_{t-1} + i_t \odot g_t$$ (Equation 7)

$$h_t = o_t \odot \tan h(c_t)$$ (Equation 8)

where W are weight matrices and b. are bias vectors. $i_t$, $f_t$, and $o_t$ are input, forget, and output gates, respectively, and $\odot$ denotes elementwise product.

When the recurrence is defined in terms of the past (as in Equations 1-8), the LSTM is a forward directed LSTM, denoted $\overrightarrow{\text{lstm}}$. Alternatively, the LSTM may be defined in terms of the future, referred to as a backward directed LSTM and denoted $\overleftarrow{\text{lstm}}$:

$$\overleftarrow{\text{lstm}}(\{x_j\}_{j=1}^t) = \text{step}^{\overleftarrow{\text{lstm}}}(x_t, \overleftarrow{\text{lstm}}(\{x_j\}_{j=t+1}^{t-1}))$$ (Equation 9)

$$(\overleftarrow{h_t}, \overleftarrow{c_t}) = \text{ste p}^{\overleftarrow{\text{lstm}}}(x_t, (\overleftarrow{h_{t+1}}, \overleftarrow{c_{t+1}}))$$ (Equation 10)

Concatenating $\overrightarrow{h_t}$ and $\overleftarrow{h_t}$ results in a contextualized representation of word $w_t^k$ inside the dialogue act $u_k$:

$$(\overrightarrow{h_t}, \overrightarrow{c_t}) = \overrightarrow{\text{lstm}}(\{\omega_j\}_{j=1}^t)$$ (Equation 11)

$$(\overleftarrow{h_t}, \overleftarrow{c_t}) = \overleftarrow{\text{lstm}}(\{\omega_j\}_{j=1}^T)$$ (Equation 12)

$$\overleftrightarrow{h_t} = [\overrightarrow{h_t}, \overleftarrow{h_t}]$$ (Equation 13)

At step 206, an utterance vector representation $v_k$ of the particular dialogue act $u_k$ is computed based on the word vector representations $\omega_t^k$. For example, as shown in framework 100 of FIG. 1, utterance vector representations 110-A, 110-B, 110-C, 110-D, 110-E, 110-F, and 110-G (collectively referred to a utterance vector representations 110) are computed based on respective word vector representations 108.

Contextualized representations of the word vector representations cot are (affinely) transformed into a feature space, which is then pooled across all the words in the dialogue acts:

$$\tilde{v}_t = W_u \overleftrightarrow{h_t} + b_u$$ (Equation 14)

$$v = \max_t \tilde{v}_t$$ (Equation 15)

where max denotes the elementwise maximum across multiple vectors, $W_u$ is the weight matrix, and $b_u$ is the bias vector. At the end of this operation, a single fixed size utterance vector representation v that represents the dialogue act $u = \{w_t^k\}_{t=1}^T$.

At step 208, an additional utterance vector representation $\phi_k$ of the particular dialogue act $u_k$ is computed based on the utterance vector representation $v_k$ of the particular dialogue act $u_k$. In one embodiment, the additional utterance vector representation is also computed based on utterance vector representations of all prior dialogue acts in the chat log and an utterance vector representation of an immediately prior dialogue act of the same participant. For example, as shown in framework 100 of FIG. 1, additional utterance vector representations 112-A, 112-B, 112-C, 112-D, 112-E, 112-F, and 112-G (collectively referred to as additional utterance vector representations 112) are computed based on respective utterance vector representations 110, utterance vector representations 112 of all prior dialogue acts 104 (shown as solid arrows between utterance vector representations 112 in FIG. 1), and an utterance vector representation of an immediately prior dialogue act of the same participant (shown as dashed arrows between utterance vector representations 112 of the same participant 102 in FIG. 1). In one example, additional utterance vector representation 112-B in FIG. 1 is computed based on utterance vector representation 110-B and utterance vector representation 112-A (i.e., utterance vector representations of all prior dialogue acts). In another example, additional utterance vector representation 112-E in FIG. 1 is computed based on utterance vector representation 110-E, utterance vector representations 112-A through 112-D (i.e., utterance vector representations of all prior dialogue acts), and utterance vector representation 112-A (i.e., the utterance vector representation of an immediately prior dialogue act of the same participant).

One approach for computing the additional utterance vector representation from a set of utterance vector representations $\{v_k\}_{j=1}^{k}$ is to use another LSTM model and feed the contextualized (given the history of past dialogue acts) utterance vector representations to a final classifier layer as follows:

$$(\phi_k, \gamma_k) = \text{lstm}^v(\{v_k\}_{i=1}^{k}) \quad \text{(Equation 16)}$$

$$\hat{y}_k = \text{softmax}(W_y \phi_k + b_y) \quad \text{(Equation 17)}$$

$$y_k = \text{argmax } \hat{y}_k \quad \text{(Equation 18)}$$

where $W_y$ is a weight matrix, $b_y$ is a vector, and $\hat{y}_k$ denotes the predicted probability distribution over the dialogue act set $Y$.

In this approach, a conversation would be represented as a flat sequence of utterance with no information about which dialogue act is generated by which participant. In order to address this, skip connections are added between consecutive dialogue acts generated by the same participant. Accordingly, dialogue acts may have two antecedents: 1) all past dialogue acts, and 2) the past dialogue act from the same participant. Accordingly, the model can build up a user history and link each dialogue act to a user's particular history within a conversation. Dialogue acts from the same participant are also closer in the computation graph.

Accordingly, Tree-LSTM equations are utilized. Let tlstm $(\{x_{\eta'}\}_{\eta' \in Sp(\eta)})$ denote a Tree-LSTM where $\eta$ is a node in a given tree or graph, $Sp(\eta)$ denotes the index set for the subtree (subgraph) spanned by $\eta$, and $\{x_{\eta'}\}_{\eta' \in Sp(\eta)}$ denotes the nodes spanned by $\eta$. Then, the tlstm is recursively defined in terms of children of $\eta$, denoted $ch(\eta)$, as follows:

$$\text{tlstm}(\{x_{\eta'}\}_{\eta' \in Sp(\eta)}) = \text{step}^{tlstm}(x_\eta, U_{\eta' \in ch(\eta)} \text{tlstm}((\{x_{\eta''}\}_{\eta'' \in Sp(\eta')}))) \quad \text{(Equation 19)}$$

$$(h_{\eta'}, c_\eta) = \text{step}^{tlstm}(x_\eta, U_{\eta' \in ch(\eta)}(h_{\eta'}, c_{\eta'})) \quad \text{(Equation 20)}$$

where the step function is defined such that:

$$i_\eta = \text{sigmoid}(W_{ix} x_\eta + \Sigma_{\eta' \in ch(\eta)} W_{ih}^{e(\eta',\eta)} h_{\eta'} + b_i) \quad \text{(Equation 21)}$$

$$f_{\eta\eta'} = \text{sigmoid}(W_{fx} x_\eta + \Sigma_{\eta'' \in ch(\eta)} W_{fh}^{e(\eta',\eta)e(\eta'',\eta)} h_{\eta''} + b_f) \quad \text{(Equation 22)}$$

$$o_\eta = \text{sigmoid}(W_{ox} x_\eta + \Sigma_{\eta' \in ch(\eta)} W_{oh}^{e(\eta',\eta)} h_{\eta'} + b_o) \quad \text{(Equation 23)}$$

$$g_\eta = \tanh(W_{cx} x_\eta + \Sigma_{\eta' \in ch(\eta)} W_{gh}^{e(\eta',\eta)} h_{\eta'} + b_g) \quad \text{(Equation 24)}$$

$$c_\eta = i_\eta \odot g_\eta + \Sigma_{\eta' \in ch(\eta)} f_{\eta\eta'} \odot c_{\eta'} \quad \text{(Equation 25)}$$

$$h_\eta = o_\eta \odot \tanh(c_\eta) \quad \text{(Equation 26)}$$

where $e(\eta',\eta) \in E$ denotes the edge type (or label) that connects $\eta'$ to $\eta$. In general, $E$ can be an arbitrary fixed size set. In one embodiment, $E$ is of size two: 1) edges that connect all prior dialogue acts to a current dialogue act, and 2) edges that connect an immediately prior dialogue act from the same participant to the current dialogue act. Since weights are parameterized by the edge types $e(\eta',\eta)$, contribution of past dialogue acts and past dialogue acts from the same participant are computed differently.

It is noted that Tree-LSTM equations are applied even though the computation graphs are not trees but directed acyclic graphs (DAGs), since each node feeds into two parents (i.e., a next dialogue act and a next dialogue act from the same participant).

Since each node cell $c_\eta$ contributes to two other cells $c_{\eta'}$ and $c_{\eta''}$ additively, recursively unfolding Equation 25 for $c_{sink}$, the cell corresponding to the last dialogue act in the chat log, gives exponentially many additive terms of $c_\eta$ in the length of the shortest path from $\eta$ and sink. This very quickly causes state explosions in the length of a conversation, which was experimentally confirmed. To address this, Equation 25 is modified as follows:

$$c_\eta = i_\eta \odot g_\eta + \max_{\eta' \in ch(\eta)} f_{\eta\eta'} \odot c_{\eta'} \quad \text{(Equation 27)}$$

where max denote the elementwise maximum over multiple vectors, which effectively picks (in an elementwise fashion) a path through either one of the children. Thus, cell growth will be at worst linear in the conversation length. Since the modified equations are more appropriate for DAGs compared to Tree-LSTMs, the modified model is referred to as DAG-LSTM.

At step 210, the additional utterance vector representation $\phi_k$ is mapped to a classification $y_k$ of the particular dialogue act $u_k$. For example, as shown in framework 100 of FIG. 1, additional utterance vector representations 112 are respectively mapped to a classification 114-A, 114-B, 114-C, 114-D, 114-E, 114-F, and 114-G (collectively referred to as classifications 114).

The additional utterance vector representation is mapped to a classification as follows:

$$(\phi_k, \gamma_k) = \text{daglstm}^v(\{v_i\}_{i=1}^{k}) \quad \text{(Equation 28)}$$

$$\hat{y}_k = \text{softmax}(W_y \phi_k + b_y) \quad \text{(Equation 29)}$$

At step 212, it is determined whether there are any dialogue acts remaining in the chat log. If it is determined that there is at least one dialogue act remaining in the chat log at step 212, method 200 returns to step 204 and steps 204-212 are repeated using the next dialogue act in the chat log as the particular dialogue act. Accordingly, steps 204-212 are repeatedly performed for each dialogue act in the chat log.

If it is determined that there are not any dialogue acts remaining in the chat log at step 212, method 200 proceeds to step 214 where the classifications of the dialogue acts are output. For example, the classifications of the dialogue acts can be output by displaying the classifications of the dialogue acts on a display device of a computer system, storing the classifications of the dialogue acts on a memory or storage of a computer system, or by classifications of the dialogue acts to a remote computer system.

While embodiments described herein are described for classification of dialogue acts, it should be understood that embodiments described herein may also be utilized for classification of emotions, sentiment analysis, thread disentanglement, or any other aspect of dialog modeling.

Figure 3:
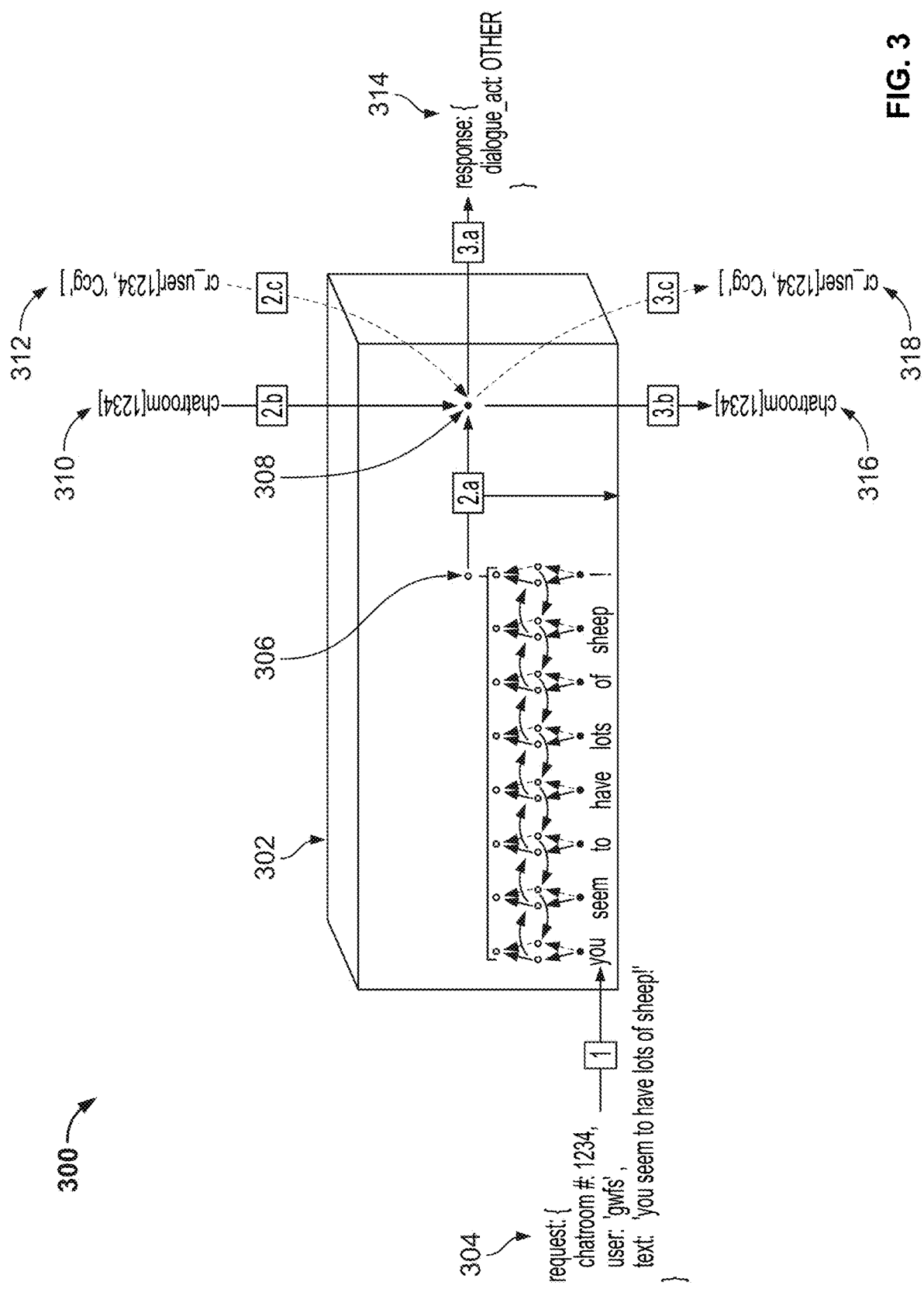
FIG. 3 shows a framework implementing one or more embodiments.

FIG. 3 shows an illustrative framework 300 implementing one or more embodiments described herein. In framework 300, a stateless service instance 302 is defined that will serve requests coming from posts from any chat root of a given instant messaging system. A request 304 is received by stateless service instance 302 (at arrow 1). Request 304 is a dialogue act defined by a chatroom number, a user, and the text of the dialogue act. Once request 304 is received, the dialogue act is represented as an utterance vector representation 306 (according to Equation 15). Stateless service instance 302 then determines an additional utterance vector representation 308 based on utterance vector representation 306 (from arrow 2.a), the last state 310 of the chatroom (input at arrow 2.b), and the last state 312 of the same participant in that chatroom (input at arrow 2.c). A response 314 (according to Equation 29) classifying the dialogue act is determined from additional utterance vector representation 308. The current state 316 of the chatroom (output at arrow 3.b) and the current state 318 of the participant (output at arrow 3.c), which are computed according to Equation 28, are output, for example, by saving the current state 316 of the chatroom and the current state 318 of the participant in a central state storage for other stateless service instances to retrieve if needed.

Figure 4:
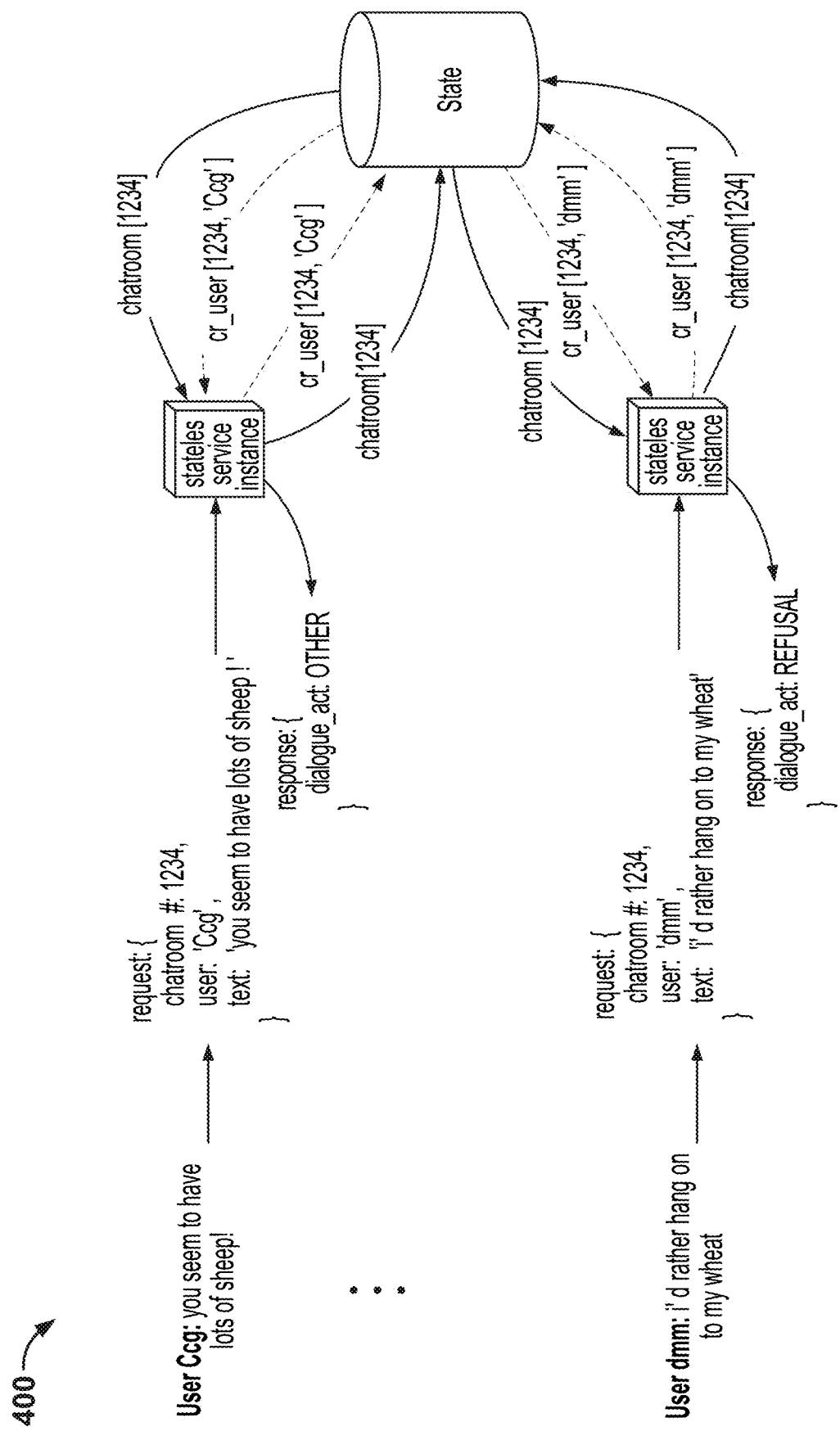
FIG. 4 shows an architecture implementing chat rooms, in accordance with one or more embodiments.

FIG. 4 shows an illustrative architecture 400 implementing one or more embodiments described herein. Architecture 400 shows how several chat rooms can be served using stateless service instances. This guarantees that the response of the system are dialogue act labels or classifications produced according to method 200 of FIG. 2. In addition, the instances being stateless guarantees that the system can linearly scale as more instances are added and the central state store scales accordingly.

Embodiments described herein were experimentally validated and compared with four baseline models. The first baseline model utilized convolutional neural networks (CNNs) for both dialogue act and context representation. The second baseline model utilized Bidirection LSTMs (BiLSMTs) for dialogue act representation and LSTMs for context representation. The third baseline model utilized CNNs for dialogue act representation and LSTMs for context representation. The fourth baseline model utilized BiLSTMs for dialogue act representation and had no context representation. Embodiments described herein were implemented with BiLSTMs for dialogue act representation and DAG-LSTMs for context representation. BiLSTMs were not utilized for context representation because such architectures are not suitable for live systems.

The evaluation of embodiments described herein against the baseline models was performed on a dataset comprising conversations from an online version of a game where trade negotiations were carried out in a chat interface. The dataset comprises over 11,000 utterances from 41 games annotated for various tasks, such as anaphoric relations, discourse units, and dialog acts. For the experimental evaluation, only the dialog act annotations were utilized. The dataset comprises six different dialogue acts, but one of those dialogue acts named Preference had very low prevalence (only 8 dialogue act) and was therefore excluded from the evaluation. FIG. 5 shows a table 500 of frequency counts for dialogue acts in the dataset.

The dataset was randomly split into three groups: a training group (29 games with 8,250 dialog acts), a dev group (4 games with 851 dialog acts), and a test group (8 games with 2,329 dialog acts). The dialog acts were tokenized using the Stanford PTBTokenizer and the tokens were represented by GloVe (Global Vectors for Word Representation) embeddings.

The Adam optimizer in the stochastic gradient descent setting was used to train all models. A patience value of 15 epochs was used (i.e., training was stopped after no observing an improvement for 15 epochs in the validation data) and each model was trained for a maximum of 300 epochs. The best iteration was selected based on the validation macro-F1 score. All models were hyperparameter-tuned using validation set macro-F1 using simple random search. A total of 100 experiments were performed to evaluate random hyperparameter candidates based on the following distributions (whenever applicable to a particular architecture):

Learning rate $\sim 10^{Uniform(-1, -3)}$
Dropout rate $\sim$Uniform(0, 0.5)
Word dropout rate $\sim$Uniform(0, 0.3)
Word vector update mode $\sim$Uniform{fixed, fine-tune}
Units in utterance layer $\sim$Uniform{50, 75, 100, 200}
Units in conversation layer $\sim$Uniform{50, 75, 100, 200}
filters in CNNs $\sim$Uniform{50, 75, 100, 200}
Window size for CNNs $\sim$Uniform{2, 3, 4}

FIG. 6 shows a table 600 comparing results of embodiments described herein against the four baseline models. Table 600 summarizes results in terms of F1 scores for individual classes, overall accuracy, and macro-F1 score. The BiLSTM+DAG-LSTM architecture, in accordance with embodiments described herein, achieved the best F1 score for four classes. The overall accuracy of 87.69% for the BiLSTM+DAG-LSTM architecture is 0.86% better than the second best model (BiLSTM+LSTM). Likewise, the macro-F1 score of 75.78% for the BiLSTM+DAG-LSTM architecture is over 1% better than the next best model.

The owners of the dataset that was utilized for the experimental validation presented results using CRFs (conditional random fields) on a preliminary version of the dataset, which included dialog acts from only 10 games. The owner CRF model reported to have achieved 83% accuracy and a 73% macro-F1 score. Though these results are not directly comparable with the results shown in table 400, they are presented herein for context.

Figure 7:
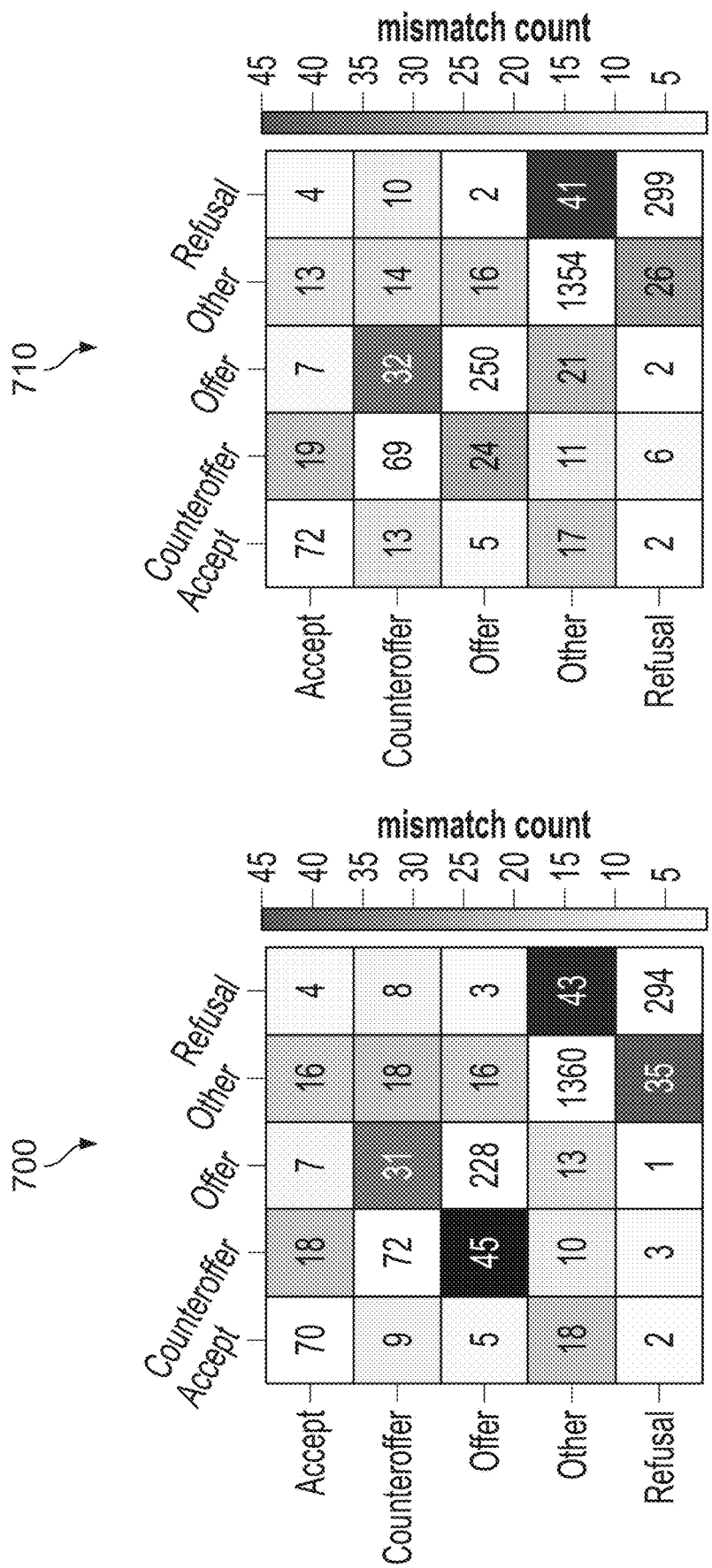
FIG. 7 shows confusion matrices comparing misclassifications of embodiments described herein against a conventional model.

FIG. 7 shows confusion matrix 700 for a BiLSTM+LSTM architecture and confusion matrix 710 for a BiLSTM+DAG-LSTM architecture in accordance with embodiments described herein. Rows of matrices 700 and 710 denote the correct classifications while columns denote the predicted classifications, where darker shading represents a relatively higher mismatch count between the correct classification and the predicted classification. As shown in FIG. 7, the BiLSTM+DAG-LSTM architecture has less confusion correctly classifying offers, specifically by avoiding mistakenly classifying an offer as a counteroffer. This suggests that using additional context information provided by skip connections in accordance with embodiments described herein is helpful, since the dialog acts for offer and counteroffer are typically similar. The BiLSTM+DAG-LSTM architecture also has less confusion misclassifying refusal as other.

FIG. 8 shows a table 800 comparing classifications of dialogue acts (labelled as "conversation") predicted using the DAG-LSTM architecture and the LSTM architecture against the correct classification to show errors made by the models. In the dialogue acts in table 800, it is again observed that the DAG-LSTM architecture, in accordance with embodiments described herein, has less confusion between offer and counteroffer classifications. It is also observed that both architectures failed to correctly classify some dialogue acts.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 2. Certain steps or functions of the methods and workflows described herein, including one or more of the steps or functions of FIG. 2, may be performed by a server or by another processor in a network-based cloud-computing system. Certain steps or functions of the methods and workflows described herein, including one or more of the steps of FIG. 2, may be performed by a client computer in a network-based cloud computing system. The steps or functions of the methods and workflows described herein, including one or more of the steps of FIG. 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
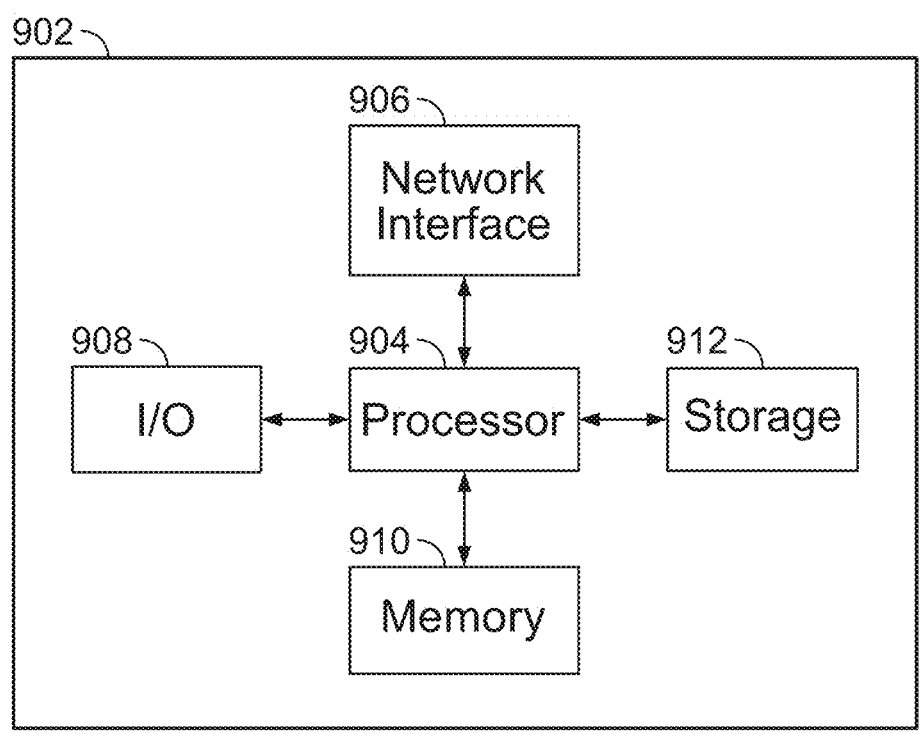
FIG. 9 shows a high-level block diagram of a computer.

A high-level block diagram of an example computer 902 that may be used to implement systems, apparatus, and methods described herein is depicted in FIG. 9. Computer 902 includes a processor 904 operatively coupled to a data storage device 912 and a memory 910. Processor 904 controls the overall operation of computer 902 by executing computer program instructions that define such operations. The computer program instructions may be stored in data storage device 912, or other computer readable medium, and loaded into memory 910 when execution of the computer program instructions is desired. Thus, the method and workflow steps or functions of FIG. 2 can be defined by the computer program instructions stored in memory 910 and/or data storage device 912 and controlled by processor 904 executing the computer program instructions. For example, the computer program instructions can be implemented as computer executable code programmed by one skilled in the art to perform the method and workflow steps or functions of FIG. 2. Accordingly, by executing the computer program instructions, the processor 904 executes the method and workflow steps or functions of FIG. 2. Computer 902 may also include one or more network interfaces 906 for communicating with other devices via a network. Computer 902 may also include one or more input/output devices 908 that enable user interaction with computer 902 (e.g., display, keyboard, mouse, speakers, buttons, etc.).

Processor 904 may include both general and special purpose microprocessors, and may be the sole processor or one of multiple processors of computer 902. Processor 904 may include one or more central processing units (CPUs), for example. Processor 904, data storage device 912, and/or memory 910 may include, be supplemented by, or incorporated in, one or more application-specific integrated circuits (ASICs) and/or one or more field programmable gate arrays (FPGAs).

Data storage device 912 and memory 910 each include a tangible non-transitory computer readable storage medium. Data storage device 912, and memory 910, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 908 may include peripherals, such as a printer, scanner, display screen, etc. For example, input/output devices 908 may include a display device such as a cathode ray tube (CRT) or liquid crystal display (LCD) monitor for displaying information to the user, a keyboard, and a pointing device such as a mouse or a trackball by which the user can provide input to computer 902.

Any or all of the systems and apparatus discussed herein may be implemented using one or more computers such as computer 902.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer implemented method for classifying a dialogue act in a chat log, comprising:
    mapping each word of the dialogue act to a word vector representation;
    computing an utterance vector representation of the dialogue act based on the word vector representations using a bidirectional long short-term memory (LSTM) architecture;
    computing an additional utterance vector representation of the dialogue act based on the utterance vector representation, the computing the additional utterance vector representation comprising:
        applying a skip connection between the dialogue act of a participant and an immediately prior dialogue act of the same participant; and
        computing the additional utterance vector representation based on an utterance vector representation of the skip connection to the immediately prior dialogue act of the same participant;
    mapping the additional utterance vector representation, with a directed-acyclic-graph long short-term memory network (DAG-LSTM), to a classification of the dialogue act; and
    outputting the classification of the dialogue act.

2. The computer implemented method of claim 1, wherein computing an additional utterance vector representation of the dialogue act based on the utterance vector representation comprises:
    computing the additional utterance vector representation based on utterance vector representations of all prior dialogue acts in the chat log.

3. The computer implemented method of claim 1, wherein computing an additional utterance vector representation of the dialogue act based on the utterance vector representation comprises:
    computing the additional utterance vector representation of the dialogue act using a modified tree long short-term memory (LSTM) based architecture.

4. The computer implemented method of claim 1, wherein the chat log is a transcript of a conversation between a plurality of participants.

5. An apparatus comprising:
    a processor; and
    a memory to store computer program instructions for classifying a dialogue act in a chat log, the computer program instructions when executed on a neural network of the processor cause the processor to perform operations comprising:
        mapping each word of the dialogue act to a word vector representation;
        computing an utterance vector representation of the dialogue act based on the word vector representations using a bidirectional long short-term memory (LSTM) architecture;
        computing an additional utterance vector representation of the dialogue act based on the utterance vector representation, the computing the additional utterance vector representation comprising:
            applying a skip connection between the dialogue act of a participant and an immediately prior dialogue act of the same participant; and
            computing the additional utterance vector representation based on an utterance vector representation of the skip connection to the immediately prior dialogue act of the same participant;
        mapping the additional utterance vector representation, with a directed-acyclic-graph long short-term memory network (DAG-LSTM), to a classification of the dialogue act; and
        outputting the classification of the dialogue act.

6. The apparatus of claim 5, wherein computing an additional utterance vector representation of the dialogue act based on the utterance vector representation comprises:
    computing the additional utterance vector representation based on utterance vector representations of all prior dialogue acts in the chat log.

7. The apparatus of claim 5, wherein computing an additional utterance vector representation of the dialogue act based on the utterance vector representation comprises:
    computing the additional utterance vector representation of the dialogue act using a modified tree long short-term memory (LSTM) based architecture.

8. The apparatus of claim 5, wherein the chat log is a transcript of a conversation between a plurality of participants.

9. A non-transitory computer readable medium storing computer program instructions for classifying a dialogue act in a chat log, the computer program instructions when executed by a processor cause the processor to perform operations comprising:
    mapping each word of the dialogue act to a word vector representation;
    computing an utterance vector representation of the dialogue act based on the word vector representations using a bidirectional long short-term memory (LSTM) architecture;
    computing an additional utterance vector representation of the dialogue act based on the utterance vector representation, the computing the additional utterance vector representation comprising:
        applying a skip connection between the dialogue act of a participant and an immediately prior dialogue act of the same participant; and
        computing the additional utterance vector representation based on an utterance vector representation of the skip connection to the immediately prior dialogue act of the same participant;
    mapping the additional utterance vector representation, with a directed-acyclic-graph long short-term memory network (DAG-LSTM), to a classification of the dialogue act; and
    outputting the classification of the dialogue act.

10. The non-transitory computer readable medium of claim 9, wherein computing an additional utterance vector representation of the dialogue act based on the utterance vector representation comprises:

computing the additional utterance vector representation based on utterance vector representations of all prior dialogue acts in the chat log.

11. The non-transitory computer readable medium of claim 9, wherein computing an additional utterance vector representation of the dialogue act based on the utterance vector representation comprises:
   computing the additional utterance vector representation of the dialogue act using a modified tree long short-term memory (LSTM) based architecture.

12. The non-transitory computer readable medium of claim 9, wherein the chat log is a transcript of a conversation between a plurality of participants.

\* \* \* \* \*

UNITED STATES PATENT AND TRADEMARK OFFICE
CERTIFICATE OF CORRECTION

PATENT NO. : 11,783,812 B2
APPLICATION NO. : 17/234745
DATED : October 10, 2023
INVENTOR(S) : Ozan Irsoy et al.

Page 1 of 1

It is certified that error appears in the above-identified patent and that said Letters Patent is hereby corrected as shown below:

In the Specification

Column 4, Line 25:

$$\overleftarrow{lstm}\left(\{x_j\}_{j=1}^{t}\right) = \text{step P}^{\overleftarrow{lstm}}\left(x_t, \overleftarrow{lstm}\left(\{x_j\}_{j=t+1}^{t-1}\right)\right) \quad \text{(Equation 9)}$$

Should read:

$$\overleftarrow{lstm}\left(\{x_j\}_{j=1}^{t}\right) = \text{step}^{\overleftarrow{lstm}}\left(x_t, \overleftarrow{lstm}\left(\{x_j\}_{j=t+1}^{t-1}\right)\right) \quad \text{(Equation 9)}$$

Column 4, Line 26:

$$\left(\overleftarrow{h_t}, \overleftarrow{c_t}\right) = \text{ste P}^{\overleftarrow{lstm}}\left(x_t, \left(\overleftarrow{h_{t+1}}, \overleftarrow{c_{t+1}}\right)\right) \quad \text{(Equation 10)}$$

Should read:

$$\left(\overleftarrow{h_t}, \overleftarrow{c_t}\right) = \text{step}^{\overleftarrow{lstm}}\left(x_t, \left(\overleftarrow{h_{t+1}}, \overleftarrow{c_{t+1}}\right)\right) \quad \text{(Equation 10)}$$

Signed and Sealed this
Twenty-eighth Day of November, 2023

*Katherine Kelly Vidal*

Katherine Kelly Vidal
*Director of the United States Patent and Trademark Office*